United States Patent
Iorio et al.

(10) Patent No.: US 9,356,535 B2
(45) Date of Patent: May 31, 2016

(54) CONTROL METHOD FOR RECTIFIER OF SWITCHING CONVERTERS

(71) Applicants: DORA S.p.A., Aosta (IT); STMicroelectronics S.r.l., Agrate Brianza (IT)

(72) Inventors: Alberto Iorio, Aosta (IT); Giuseppe Scappatura, Aosta (IT); Alberto Bianco, Gressan (IT); Claudio Adragna, Monza (IT); Silvio De Simone, Busto Arsizio (IT); Maurizio Foresta, Aosta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 164 days.

(21) Appl. No.: 14/458,078

(22) Filed: Aug. 12, 2014

(65) Prior Publication Data

US 2015/0049529 A1 Feb. 19, 2015

(30) Foreign Application Priority Data

Aug. 14, 2013 (IT) .............................. MI2013A1394

(51) Int. Cl.
*H02M 7/217* (2006.01)
*H02M 3/335* (2006.01)
*H02M 1/00* (2006.01)

(52) U.S. Cl.
CPC .......... *H02M 7/217* (2013.01); *H02M 3/33507* (2013.01); *H02M 3/33592* (2013.01); *H02M 2001/0058* (2013.01); *Y02B 70/1475* (2013.01); *Y02B 70/1491* (2013.01)

(58) Field of Classification Search
CPC ................. H02M 3/33592; H02M 2001/0058; H02M 7/217
See application file for complete search history.

(56) References Cited

U.S. PATENT DOCUMENTS

| | | | | |
|---|---|---|---|---|
| 7,599,198 | B2 * | 10/2009 | Tao | ................... H02M 3/33592 363/17 |
| RE42,142 | E * | 2/2011 | Solie | ...................... H02J 7/022 320/145 |

(Continued)

OTHER PUBLICATIONS

Feng, W. et al., "Digital Implementation of Driving Scheme for Synchronous Rectification in LLC Resonant Converter," IEEE Energy Conversion Congress and Exposition, Atlanta, GA, pp. 256-263, Sep. 12-16, 2010.

(Continued)

*Primary Examiner* — Timothy J Dole
*Assistant Examiner* — Yusef Ahmed
(74) *Attorney, Agent, or Firm* — Seed IP Law Group PLLC

(57) ABSTRACT

A control device for a transistor of a switching converter rectifier generates a control signal of the transistor and includes a circuit to measure the conduction time of the body diode of the transistor cycle by cycle. When the conduction time is greater than a first threshold, the off time instant of the transistor is delayed by a first quantity in the next cycles, until the conduction time is less than the first threshold and greater than a second threshold. When the conduction time is between the first and second thresholds, the off time instant is delayed by a fixed second quantity in the next cycles until the conduction time is lower than the second threshold, with the second quantity less than the first quantity. When the conduction time is lower than the second threshold, the off time instant is advanced by the second quantity in the next cycle.

17 Claims, 13 Drawing Sheets

(56) References Cited

U.S. PATENT DOCUMENTS

| | | | | |
|---|---|---|---|---|
| 8,416,597 B2* | 4/2013 | Adragna | ............ | H02M 3/33592 363/127 |
| 2004/0136207 A1* | 7/2004 | Havanur | ............ | H02M 3/33592 363/21.06 |
| 2007/0008757 A1* | 1/2007 | Usui | ................ | H02M 3/33507 363/125 |
| 2009/0161396 A1* | 6/2009 | Lin | .................. | H02M 3/33592 363/125 |
| 2009/0231895 A1* | 9/2009 | Hu | .................... | H02M 3/33592 363/127 |
| 2009/0244932 A1* | 10/2009 | Lin | .................. | H02M 3/33592 363/21.06 |
| 2009/0284992 A1* | 11/2009 | Kenly | ................ | H02M 3/156 363/21.06 |
| 2010/0103704 A1* | 4/2010 | Adragna | ............ | H02M 3/33592 363/21.02 |
| 2011/0051464 A1 | 3/2011 | Lou et al. | | |
| 2012/0063175 A1 | 3/2012 | Wang et al. | | |
| 2012/0161739 A1* | 6/2012 | Lund | ................ | H02M 3/33523 323/285 |
| 2013/0063984 A1* | 3/2013 | Sandner | ................ | H02M 1/38 363/20 |
| 2013/0077354 A1* | 3/2013 | Behagel | ............ | H02M 3/33523 363/21.01 |
| 2013/0194836 A1* | 8/2013 | Morris | .................... | H02M 1/32 363/21.14 |
| 2013/0194842 A1* | 8/2013 | Bianco | ................ | H02M 1/4225 363/84 |
| 2013/0272036 A1* | 10/2013 | Fang | ................ | H02M 3/33507 363/21.17 |
| 2014/0300329 A1* | 10/2014 | Thompson | ............ | H03K 5/1536 323/235 |
| 2015/0043249 A1* | 2/2015 | Iorio | .................... | H03K 17/133 363/21.03 |
| 2015/0049521 A1* | 2/2015 | Iorio | .................... | H02M 3/1588 363/21.02 |
| 2015/0049522 A1* | 2/2015 | Iorio | ................ | H02M 3/33576 363/21.03 |
| 2015/0049529 A1* | 2/2015 | Iorio | ................ | H02M 3/33507 363/89 |

OTHER PUBLICATIONS

Feng, W. et al., "A Universal Adaptive Driving Scheme for Synchronous Rectification in LLC Resonant Converters," IEEE Transactions on Power Electronics (27)8:3775-3781, Aug. 2012.

* cited by examiner

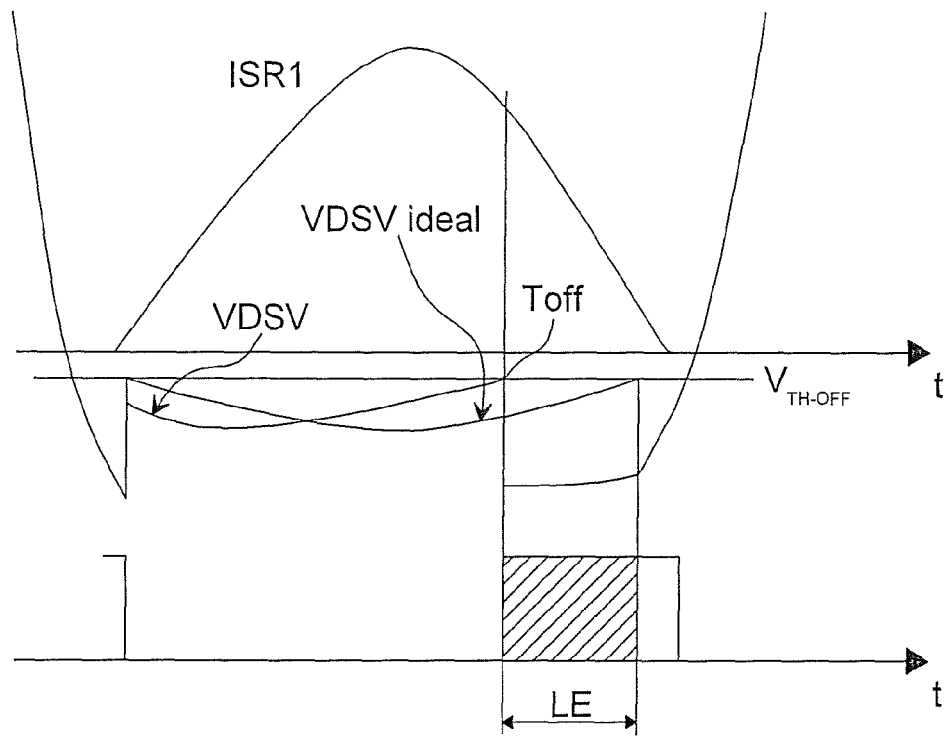
*FIG. 4* (Prior Art)
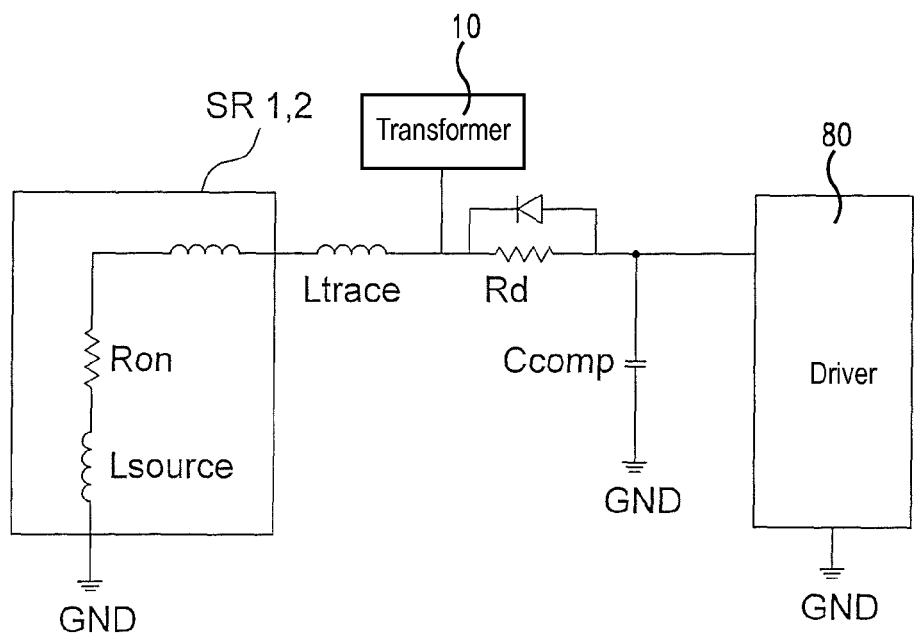
*FIG. 5*    (Prior Art)

CONTROL METHOD FOR RECTIFIER OF SWITCHING CONVERTERS

BACKGROUND

1. Technical Field

The present disclosure relates to a control method for rectifier of switching converters.

2. Description of the Related Art

Resonant converters are a large class of forced switching converters characterized by the presence of a half-bridge or a full-bridge circuit topology. In the half-bridge version, for example, the switching elements comprise a high-side transistor and a low-side transistor connected in series between an input voltage and ground. A square wave having a high value corresponding to the power supply voltage and a low value corresponding to ground may be generated by conveniently switching the two transistors.

The square wave generated by the half-bridge is applied to the primary winding of a transformer by means of a resonant circuit which comprises at least one capacitor and one inductor. The secondary winding of the transformer is connected with a rectifier circuit and a filter to provide an output direct voltage depending on the frequency of the square wave.

At present, one of the resonant converters most widely used is the LLC resonant converter. This name derives from the fact that the resonant circuit employs two inductors (L) and a capacitor (C). A schematic circuit of an LLC resonant converter is shown in FIG. 1 and comprises a half-bridge of MOSFET transistors M1 and M2, with respective body diodes Db1 and Db2, coupled between an input voltage Vin and ground GND and driven by a driver circuit 3. The common terminal between transistors M1 and M2 is connected to a resonant network 2 comprising a series of a first inductance Lr, a second inductance Lm and a capacitor Cr; the inductance Lm is connected in parallel to a transformer 10 comprising a secondary winding connected to the parallel of a capacitor Co and a resistance Rout by means of the rectifier diodes D1 and D2. The output voltage Vo of the resonant converter is the voltage across said parallel, while the output current Io flows through the resistance Rout.

These resonant converters are characterized by a high conversion efficiency (>95% is easily achievable), an ability to work at high frequencies, low generation of EMI (electromagnetic interference).

In current types of converter circuits, a high conversion efficiency and high power density are desired, as in the case, for example, of the AC-DC adaptors of notebooks. LLC resonant converters are at present the converters that best meet such desires.

However, the maximum efficiency achievable is limited by the losses in the rectifiers on the secondary side of the converter, which account for over 60% of total losses.

It is known that in order to significantly reduce the losses connected to secondary rectification, recourse can be made to the so-called "synchronous rectification" technique, in which rectifier diodes are replaced by power MOSFETs, with a suitably low on-resistance, such that the voltage drop across it is significantly lower than that across the diode; and they are driven in such a manner as to be functionally equivalent to the diode. This technique is widely adopted in traditional converters, especially in flyback and forward converters, for which there also exist commercially available dedicated integrated control circuits. There is an increasingly pressing desire to adopt this technique in resonant converters as well, in particular in LLC converters, in order to enhance their efficiency as much as possible.

FIG. 2 shows the converter of FIG. 1 in the version with secondary synchronous rectifiers; in this case, in the place of diodes D1 and D2 there are two transistors SR1 and SR2, suitably driven by two signals G1 and G2 deriving from a driver 80, and connected between the terminals of the two parts of the center-tapped secondary winding connected to ground GND, while the parallel of Co and Rout is disposed between the center tap of the secondary winding and ground GND. From a functional viewpoint there is no difference, as compared to the schematic in FIG. 1.

The transistors SR1 and SR2 have respective body diodes Dbr1 and Dbr2, and are both driven by a synchronous rectifier driver 80. The output voltage Vo of the resonant converter is the voltage across said parallel, while the output current Io flows through the resistance Rout.

In operation, the transistors SR1 and SR2 are driven in such a manner to be alternatively turned-on at a certain frequency by the synchronous rectifier driver. When the body diode Dbr1, Dbr2 of one of the transistors SR1, SR2 starts conducting the relative transistor is turned-on, while when the current is approaching to zero the transistor is turned-off; in this way the use of the transistors SR1, SR2 causes a lower voltage drop than the use of the diodes D1, D2 and the power dissipation is reduced.

Particularly, as shown in FIG. 3, a phase A is activated when the voltage Vdvs between the drain and source terminals of one of the transistor SR1, SR2, for example SR1, is lower than a voltage value of 0.7V the relative body diode Dbr1 starts conducting; then when the voltage Vdvs falls under a turn-on threshold voltage $V_{TH\_ON}$ and after a fixed delay time period $T_{PD\_ON}$, always if the voltage Vdvs is maintained under the turn-on threshold voltage $V_{TH\_ON}$, the transistor SR1 is turned on from the driver.

After the turn on of the transistor SR1, in a phase B, the voltage Vdvs has a value of Vdvs=−Rdson×Isr, wherein Rdson is the on resistance of the transistor SR1, SR2 and Isr is the current flowing through the electric path between the center-tap CT of the secondary winding of the transformer and ground GND.

When the voltage Vdsv has a value higher than a second threshold voltage Vdsoff, the transistor SR1 is turned off by the rectifier driver 80. The respective body diode Dbr1 conducts again and the voltage Vdsv goes negative; when the voltage Vdsv reaches the value of 1.4V, the drive circuit relative to the transistor SR2 is enabled.

However, the voltage Vdsv depends on parasitic elements of the source and drain terminal of the transistor SR1, SR2 and of the path of printed circuit board (PCB) from the drain terminal of the transistor SR1, SR2 and the terminal of the secondary winding. Particularly, the voltage Vdsv depends on the parasitic inductances Lsource and Ldrain associated to the source and drain terminal of the transistor SR1, SR2 and on the parasitic inductance Ltrace relative to the path of printed circuit board (PCB) from drain terminal of the transistor SR1 or SR2 and the terminal of the secondary winding, therefore $$Vdsv = -Rdson \times Isr - (Ldrain + Lsource + Ltrace) \times \frac{\partial Isr}{\partial t};$$

the parasitic inductances make the sensed voltage Vdsv different from the ideal voltage drop value on Rdson.

The presence of the parasitic inductances Ldrain, Lsource and Ltrace determines an undesired earlier turn-off of the transistors SR1, SR2 as shown in FIG. 4 where the drain-source voltage Vdvs and the desired voltage Vdvs-ideal are shown. The residual conduction time $T_{diode}$ of the body diode Dbr1 or Dbr2 increases, causing a loss of efficiency (indicated with LE in FIG. 4) due to the higher voltage drop across the body diode Dbr1 or Dbr2.

For example, a typical starting body diode residual conduction time $T_{diode}$ could be of 1 micro second, while a typically desired time $T_{diode}$ value is 60 nanoseconds.

A known technique to avoid the earlier turn-off of the transistors SR1, SR2 (FIG. 5) is to compensate the time delay due to the parasitic inductances by adding an RC filter downstream the rectifier driver 80 and before the transformer 10. The RC filter comprises an external capacitor Ccomp and a tunable resistor Rd. Current inversion should be avoided to prevent converter malfunctions and failure.

This solution has the advantages of providing a simple architecture with a consequent low cost in term of silicon area and good performance.

However, external components to optimize efficiency are typically employed. Furthermore the RC compensation of the of the parasitic inductances Ldrain, Lsource and Ltrace may cause a delay to turn on the transistors SR1, SR2; a bypass diode arranged in parallel to the resistor Rd eliminates this turn-on time delay. Furthermore, a resistor, of the value of about 100-200Ω, arranged in series to the bypass diode (not shown in FIG. 4) is typically used to limit the current Isr1,2 out of the drain terminal of the transistors SR1, SR2, in the case wherein the voltage Vdsv goes excessively under ground GND.

Also the efficiency of the solution of prior art is dependent on the residual conduction time of the body diodes Dbr1, Dbr2 which in turn depends on the on resistances of the transistors SR1, SR2, on the parasitic elements of the transistors and the printed circuit board wherein the transistors are implemented, on the temperature and on the slew rate of the current flowing through the transistor.

BRIEF SUMMARY

One aspect of the present disclosure is a control device for a rectifier of a switching converter which avoids the undesired earlier turn-off of the transistors SR1, SR2 of the rectifier. Also the control device increases the efficiency of the switching converter.

One aspect of the present disclosure is a control device for a rectifier of a switching converter, the rectifier comprising at least one MOS transistor, the control device being configured to generate a turn on and off signal of the at least one transistor, wherein the control device comprises a measuring circuit to measure the conduction time of the body diode of at least one transistor during each converter switching half-cycle cycle by cycle, the control device being configured to cycle by cycle:

verify that the measured conduction time is greater or less than a first threshold value, in the case wherein the measured conduction time is greater than the first threshold value, delay the off time instant of the at least one transistor of a first fixed quantity in the next switching cycle, cycle by cycle until the measured conduction time is less than a first threshold value and comprised between said first threshold value and a second threshold value, in the case wherein the measured conduction time is lower than the first threshold value and comprised between said first threshold value and a second threshold value, delay the off time instant of the at least one transistor of a second fixed quantity in the next switching cycle, cycle by cycle until the measured conduction time is lower than the second threshold value, said second fixed quantity being less than the first fixed quantity, in the case wherein the measured conduction time is lower than the second threshold value, advance the off time instant of the at least one transistor of said second fixed quantity in the next switching cycle.

Another aspect of the present disclosure is a method of controlling a rectifier of a switching converter, the rectifier comprising at least a MOS transistor, the method comprising:

generating a turn on and off signal of the at least one transistor, and cycle by cycle measuring the conduction time of the body diode of the at least a transistor in a switching half-cycle of a converter switching cycle, verifying that the measured conduction time is greater or less than a first threshold value, in the case wherein the measured conduction time is greater than the first threshold value, delaying the off time instant of the at least one transistor of a first fixed quantity in the next switching cycle, cycle by cycle until the measured conduction time is less than a first threshold value and comprised between said first threshold value and a second threshold value, in the case wherein the measured conduction time is lower than the first threshold value and comprised between said first threshold value and a second threshold value, delaying the off time instant of the at least one transistor of a second fixed quantity in the next switching cycle, cycle by cycle until the measured conduction time is lower than the second threshold value, said second fixed quantity being less than the first fixed quantity, in the case wherein the measured conduction time is lower than the second threshold value, advance the off time instant of the at least one transistor of said second fixed quantity in the next switching cycle.

BRIEF DESCRIPTION OF THE SEVERAL VIEWS OF THE DRAWINGS

For a better understanding of the present disclosure, a preferred embodiment thereof is now described, purely by way of non-limiting example and with reference to the annexed drawings, wherein:

FIG. 4 shows the waveforms of the current flowing through one transistor of the rectifier in FIG. 2 with a premature turning off of the transistor;

FIG. 5 shows a transistor of the rectifiers of FIG. 2 with the parasitic elements, an RC compensation filter and a bypass diode;

DETAILED DESCRIPTION

Figure 1:
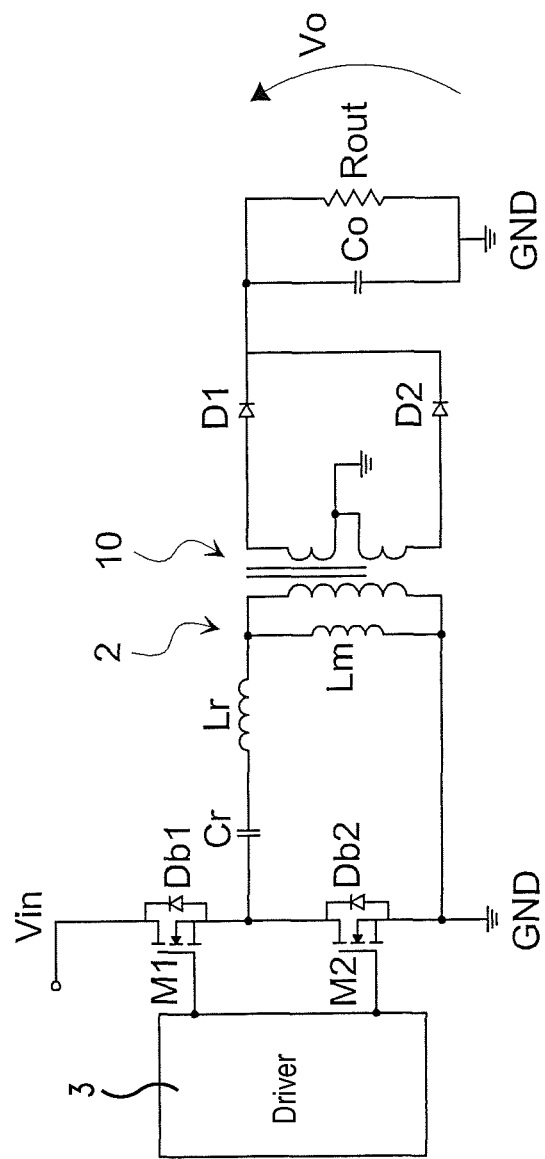
FIG. 1 is a diagram of an LLC-type resonant converter with a center-tapped secondary winding and rectification of the output current by means of diodes according to prior art.
Figure 2:
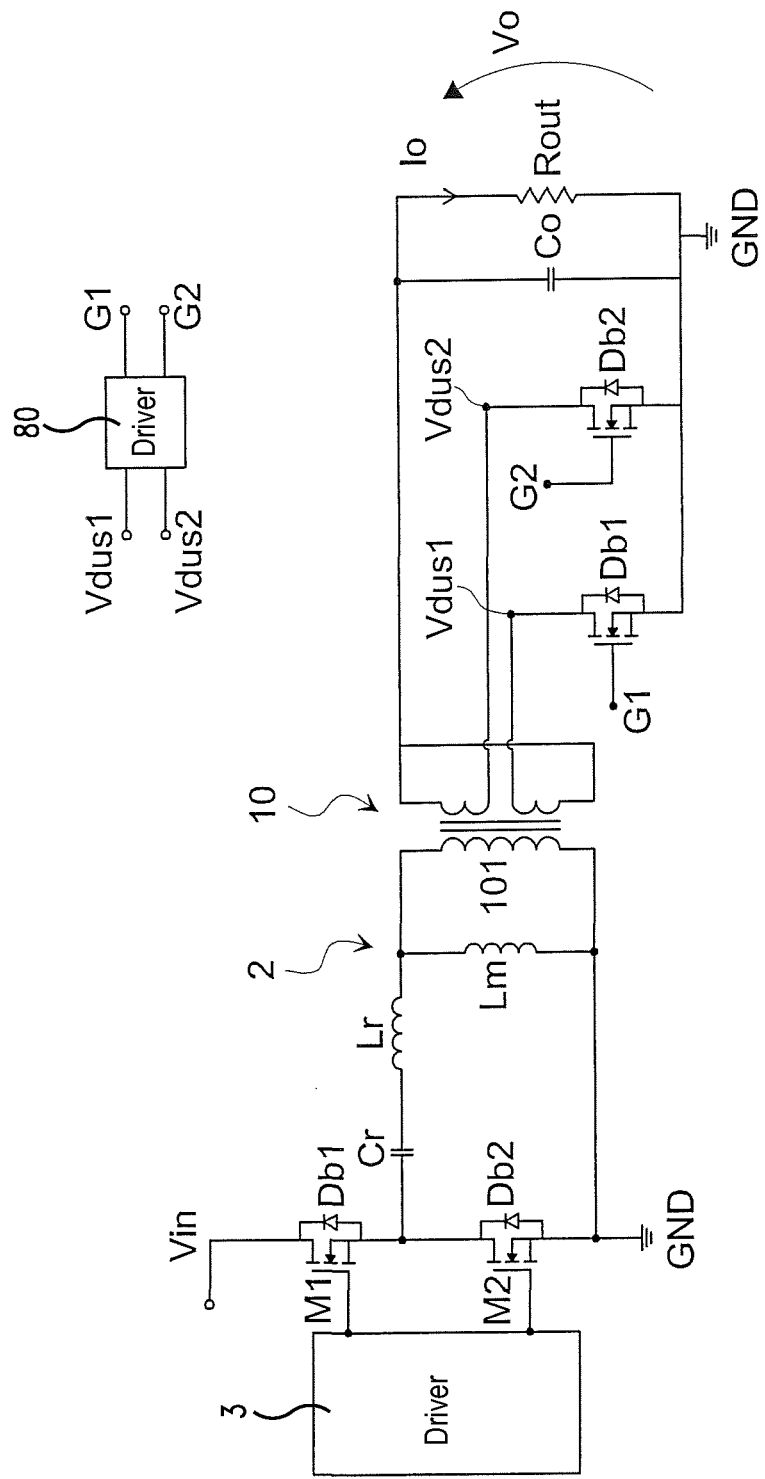
FIG. 2 is a diagram of an LLC-type resonant converter with a center-tapped secondary winding and rectification of the output current by means of synchronous rectifier according to prior art.
Figure 3:
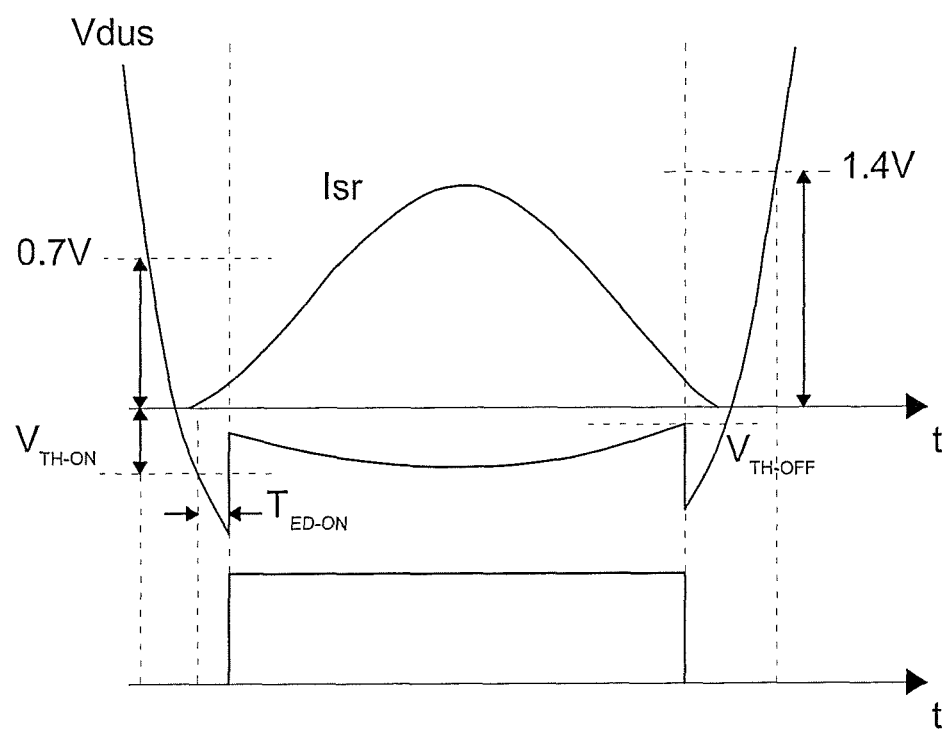
FIG. 3 shows the waveforms of the current flowing through a transistor of the rectifiers of FIG. 2 and of its drain source voltage.
Figure 6:
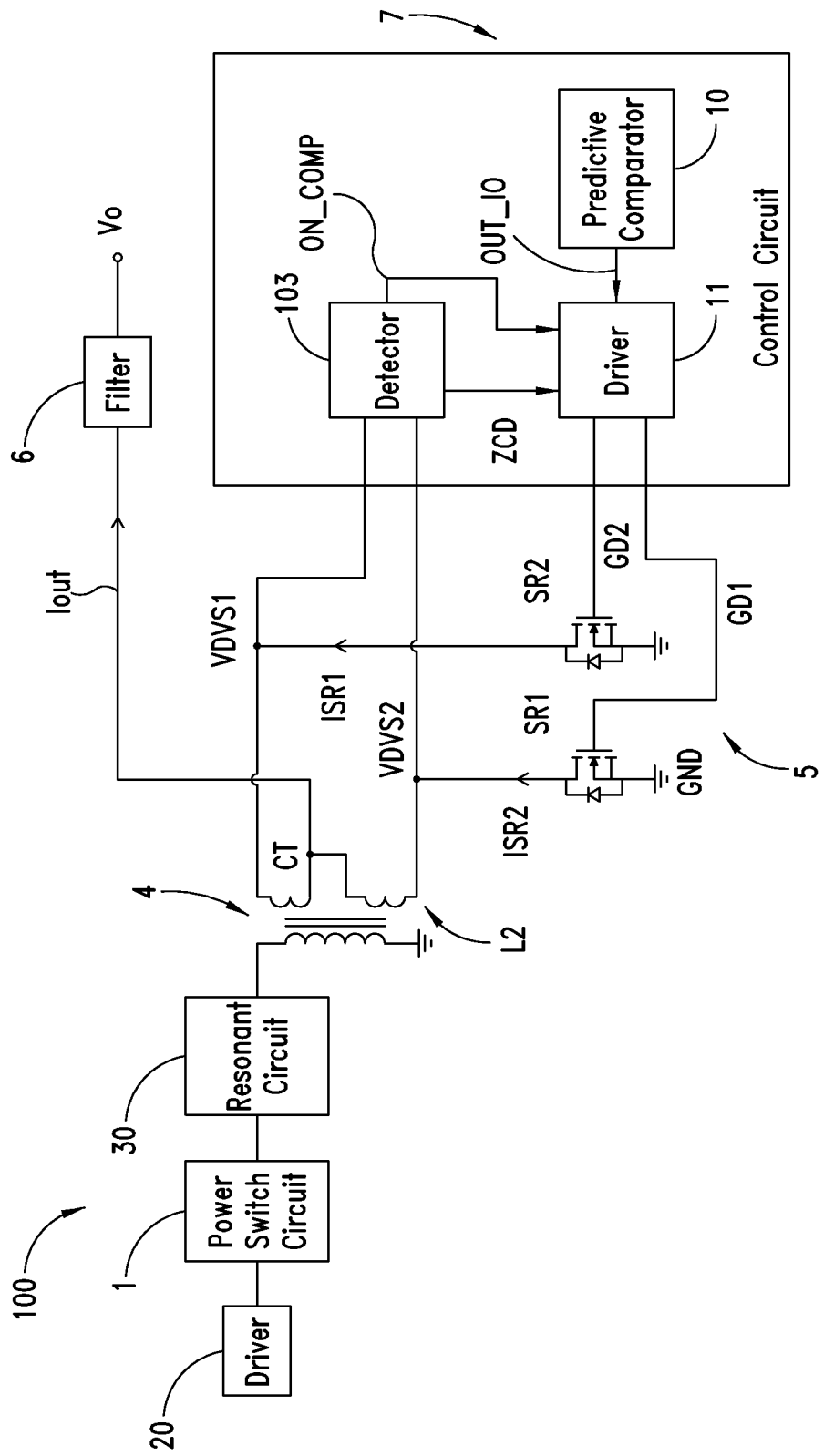
FIG. 6 is a block diagram of a switching converter comprising a control device for a rectifier of a switching converter according to a preferred embodiment of the present disclosure.

A control device for a rectifier of a switching converter according to a preferred embodiment of the present disclosure is shown in FIG. 6. The switching converter 100 comprises a power switching circuit block 1, powered by DC voltage and configured to generate a square wave with a certain frequency under the drive given by a first driver 20. For example, the power switching circuit block 1 could be a half-bridge or a full-bridge circuit topology (typically of MOSFET transistors) but other power switching circuit blocks could be equally adopted. The switching converter 100 comprises an impedance 30 connected to the primary winding of a transformer 4; the converter is adapted to provide an output current.

Preferably the switching converter 100 is an LLC resonant converter and the impedance 30 is a resonant circuit.

The square wave generated by the power switching circuit block 1 is applied to the resonant circuit 30 tuned to the fundamental frequency of the square wave. In this, manner, because of its selective characteristics, the resonant circuit 30 responds principally to this fundamental component and to a negligible degree to higher-order harmonics. It follows that the circulating power can be modulated by varying the frequency of the square wave, while maintaining the duty cycle constant at 50%, and that, according to the configuration of the resonant circuit 30, the currents and/or voltages associated with the power flow will have a pattern that is sinusoidal or sinusoidal at intervals.

Said resonant circuit 30 is coupled to a transformer 4, comprising a primary L1 and center-tapped secondary L2 windings.

A rectifier 5 comprising at least a transistor SR1, SR2 is coupled to the center-tapped secondary winding L2 of the transformer 4. Preferably, the rectifier 5 comprises a pair of transistors SR1 and SR2 which have drain terminals connected with respective terminals of two portions of the center-tapped secondary winding L2 and source terminals connected with ground reference GND. The center-tap CT of the secondary winding L2 is then connected to a filter 6 which provides the output current Iout and output voltage Vo. Said filter could be a common parallel of a capacitor and a resistance.

Said two transistors SR1, SR2 are preferably two MOSFET transistors with respective body diodes Dbr1, Dbr2 and a suitably low on-resistance Ron, such that the drain-source voltage drop across it is significantly lower than the voltage drop across a diode, like in prior art rectifier configurations.

A control device 7 drives the rectifier 5; preferably the control device 7 drives synchronously said transistors pair SR1 and SR2 by means of two signals GD1 and GD2, applied to the control terminals of the transistors SR1 and SR2, respectively. The control device 7 has as its inputs the currents ISR1, ISR2 (or equally, the drain-source voltages Vdvs1 and Vdvs2) of the transistors SR1, SR2, and outputs the two control signals GD1, GD2, respectively for the transistors SR1, SR2. A set of further signals and other temporal parameters which are used by control device 7 are described below.

Particularly, said control device 7 comprises a driving circuit 11 which provides the control signal GD1, GD2 to the at least a transistor SR1, SR2 and preferably a predictive comparator circuit 10. The driving circuit 11 receives the output signals of a detecting circuit 103 having at input the drain-source voltage Vdvs1 or Vdvs2 of the MOS transistors SR1, SR2.

Figure 11:
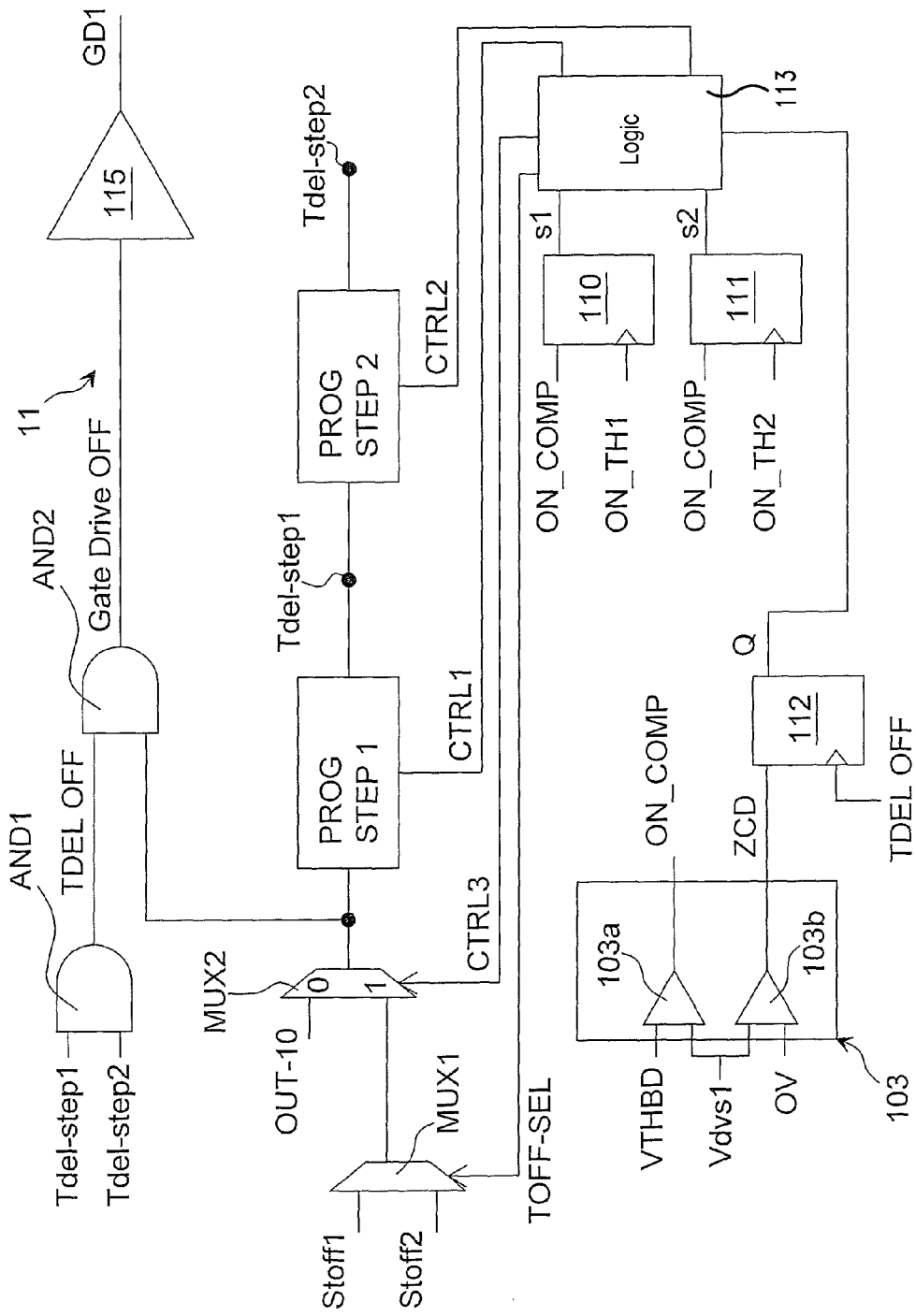
FIG. 11 shows some circuits used in the driving circuit of the control device according to the present disclosure.
Figure 12:
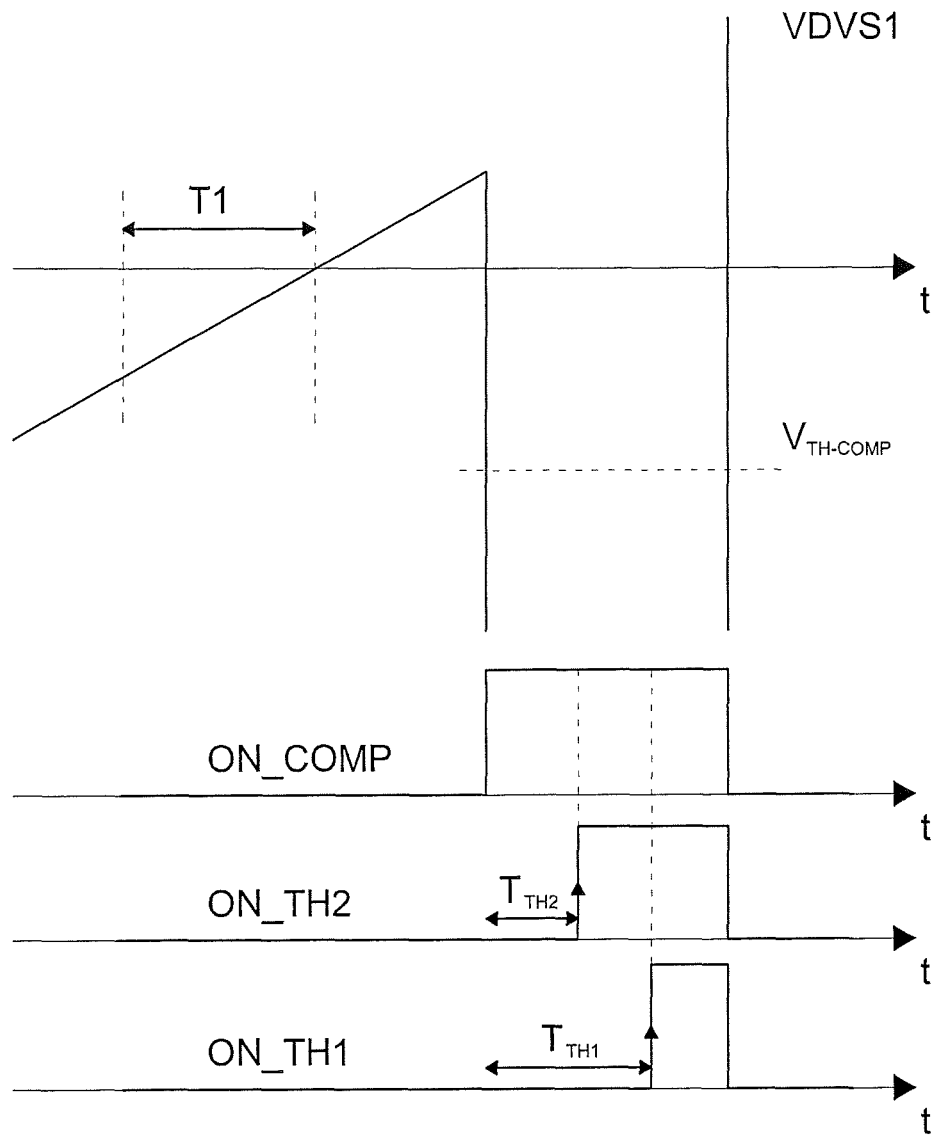
FIGS. 12-13 shows the waveforms of some signals in play in the driving circuit of FIG. 11.

The detecting circuit 103 is configured to detect when the drain-source voltage Vdvs1 or Vdvs2 crosses a voltage threshold Vthbd (typically −200 mV) by providing, as a response, an output signal ON_COMP. Particularly the detecting circuit 103 comprises a first comparator circuit 103a configured to provide the output signal ON_COMP as an output pulse signal which starts when the drain-source voltage Vdvs1, Vdvs2 of the transistor SR1, SR2 goes under the fixed voltage threshold Vthbd and ends when said drain-source voltage Vdvs1, Vdvs2 rises reaching the same fixed voltage threshold Vthbd (FIG. 11).

Further the detecting circuit 103 is configured to detect a zero crossing event of the drain-source voltage Vdvs1 or Vdvs2 of the MOS transistors SR1, SR2 and to provide an output signal ZCD as a response. Particularly the detecting circuit 103 comprises a second comparator circuit 103b configured to provide an output pulse signal ZCD when the drain-source voltage Vdvs1 or Vdvs2 crosses the zero voltage level, that is the ground GND (FIG. 11).

Figure 7:
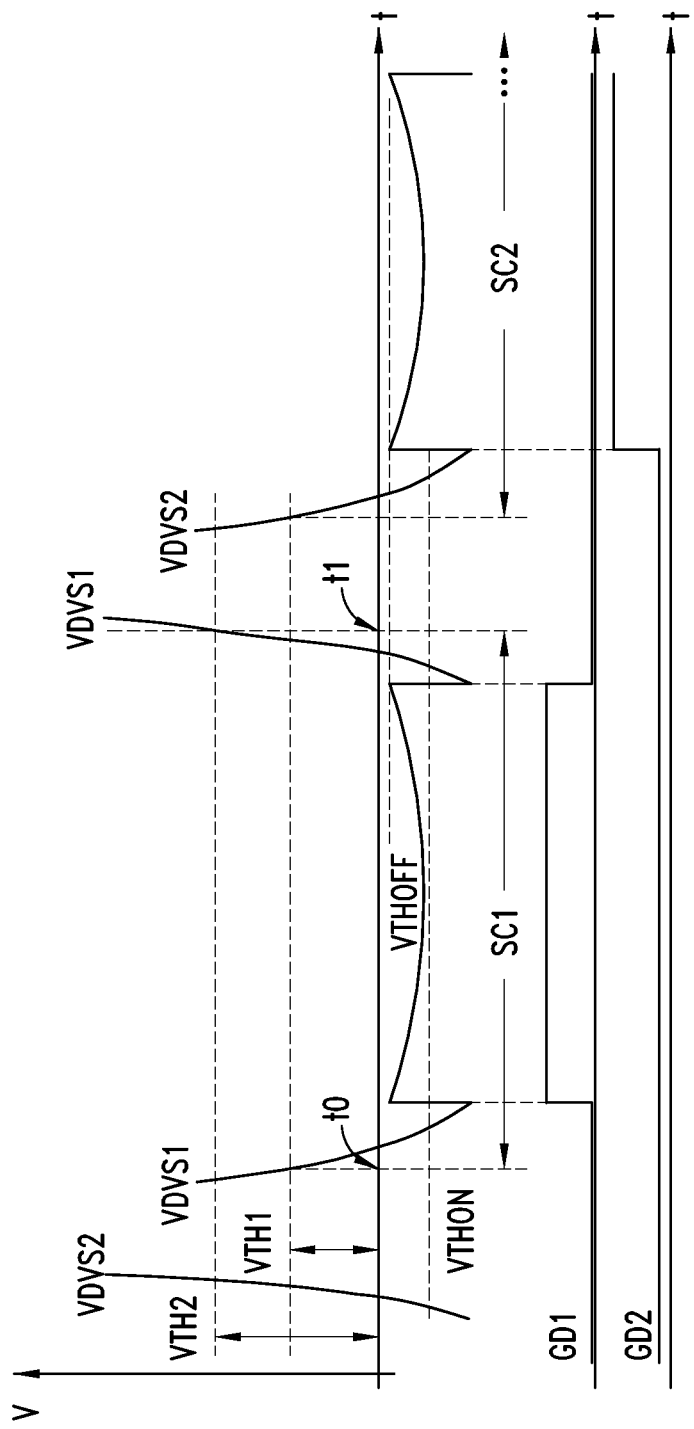
FIG. 7 is a time diagram of the waveforms of the drain-source voltages of the transistors of a synchronous rectifier of prior art.

Each switching half-cycle SC1, SC2 of the converter 100 involves alternately one of the two transistors of the transistor pair SR1, SR2, and in particular each half-cycle SC1, SC2 begins when the drain-source voltage Vdvs1, Vdvs2 is equal to a threshold value of 0.7V and ends when the drain-source voltage Vdvs1, Vdvs2 reaches a threshold value of 1.4V (FIG. 7). Considering FIG. 7 the transistor SR1 is operative during the first half-cycle SC1 of the switching cycle SW while the transistor SR2 is operative during the second half-cycle SC2 of the switching cycle SW.

The drain-source voltages Vdvs1, Vdvs2 and the currents ISR1, ISR2 of the MOSFET transistors SR1 and SR2 have a temporal trend as shown in FIG. 7. Each switching cycle of the converter 100 comprises the alternately turning on and off the transistors SR1, SR2; therefore each switching half-cycle SC1, SC2 of the converter 100 involves alternately one of the two transistors of the pair SR1, SR2, and in particular each half-cycle SC1, SC2 begins when the drain-source voltage Vdvs1 or Vdvs2 is equal to a threshold value Vth1 of preferably 0.7V and ends when the same drain voltage Vdvs1 or Vdvs2 reaches a threshold value Vth2 preferably of 1.4V. For example, in an application with a converter switching frequencies of 100 KHz the half-cycle SC1, SC2 is equal to 5 micro seconds.

As already above-mentioned, the presence of parasitic inductances Ldrain, Lsource and Ltrace determines an undesired earlier turn-off $T_{off}$ of the transistors SR1, SR2, as shown in FIG. 4 where the drain-source voltage Vdvs1 or Vdvs2 and the desired voltage Vdvs-ideal are shown. The residual conduction time $T_{diode}$ of the body diode Dbr1 or Dbr2 increases, causing a loss of efficiency (indicate with LE in FIG. 4) due to the higher voltage drop across the body diode Dbr1 or Dbr2.

For example, a typical starting body diode residual conduction time $T_{diode}$ could be of 1 micro second, while a typical desired body diode residual conduction time value is 60 nanoseconds.

Considering the start switching cycle SW, and particularly the start switching half-cycle SC1, SC2 wherein the transistor SR1 is turned on, the control device 7 according to a preferred embodiment of the present disclosure is configured to set a new off time instant $T_{off1}$ of the transistor SR1 in the start switching half-cycle of the start converter switching cycle. The new off time instant $T_{off1}$ is set so that it immediately precedes a large time interval T1 with respect the time instant of the zero crossing event of the drain-source voltage Vdvs1; the new off time instant $T_{off1}$ has a fixed value, preferably a percentage of the same half-cycle SC1, SC2. This new off time instant $T_{off1}$ is appropriately chosen to take into account the gate drive discharge time of the transistors SR1 and other additional factors before a complete transistor turn-off. A reasonable off time instant $T_{off1}$ could be equal to the 70% of the start switching half-cycle SC1, SC2, but other suitable percentages could be used in order to set the off time instant $T_{off1}$.

Figure 10A:
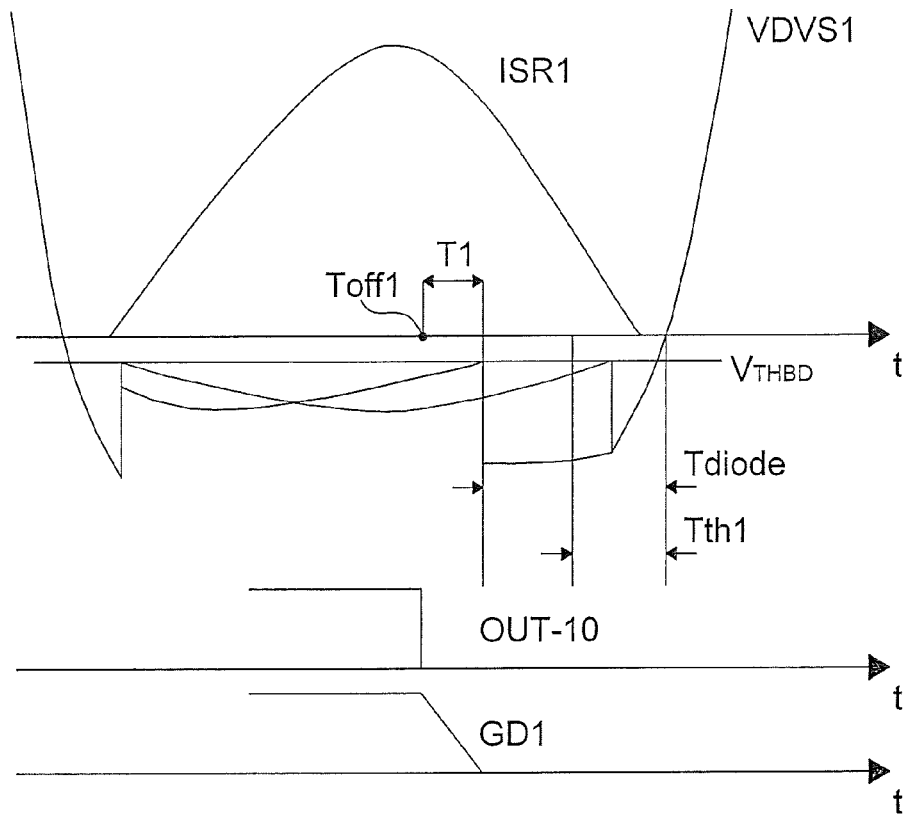
FIGS. 10a-10e shows different operation steps of the control device according to the variant of the preferred embodiment of the present disclosure.

Once set the new off time instant $T_{off1}$ (FIG. 10a), the driving circuit 11 is then configured to measure the residual conduction time $T_{diode}$ of the body diode Dbr1. Particularly, the residual conduction time $T_{diode}$ starts when the drain-source voltage Vdvs1 goes under the fixed voltage threshold Vthbd, and ends when the drain-source voltage Vdvs1 rises and reaches the same fixed voltage threshold Vthbd.

Figure 10B:
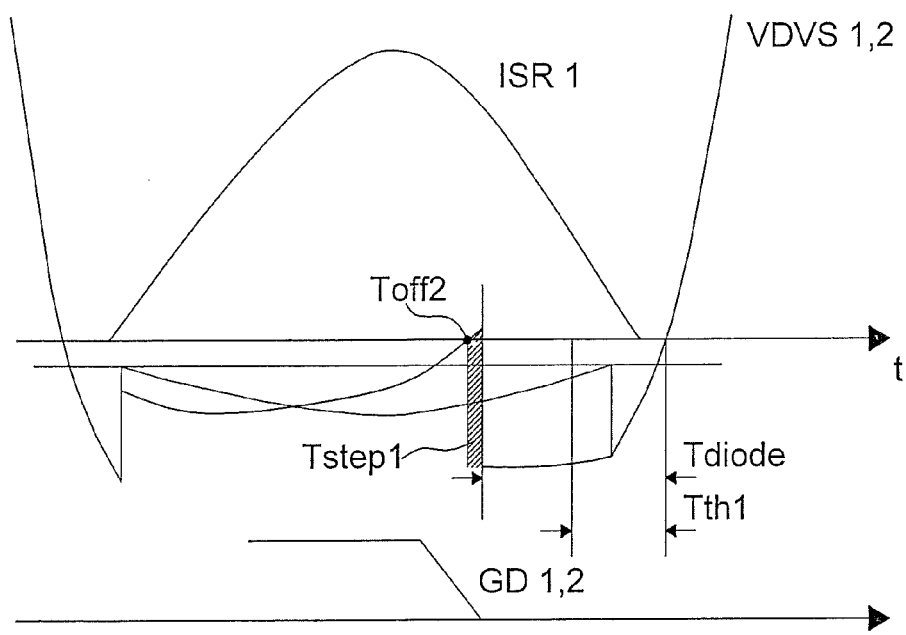
Figure 10C:
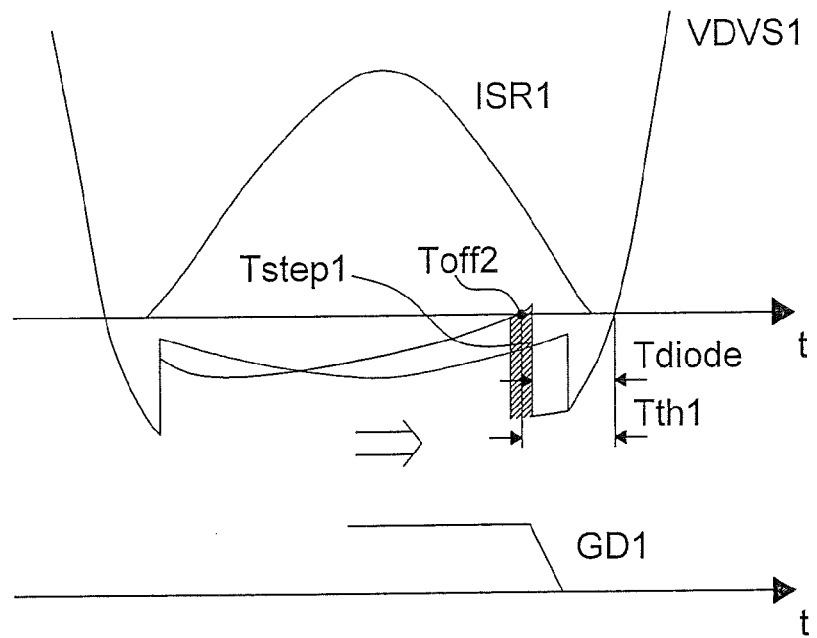
Figure 10D:
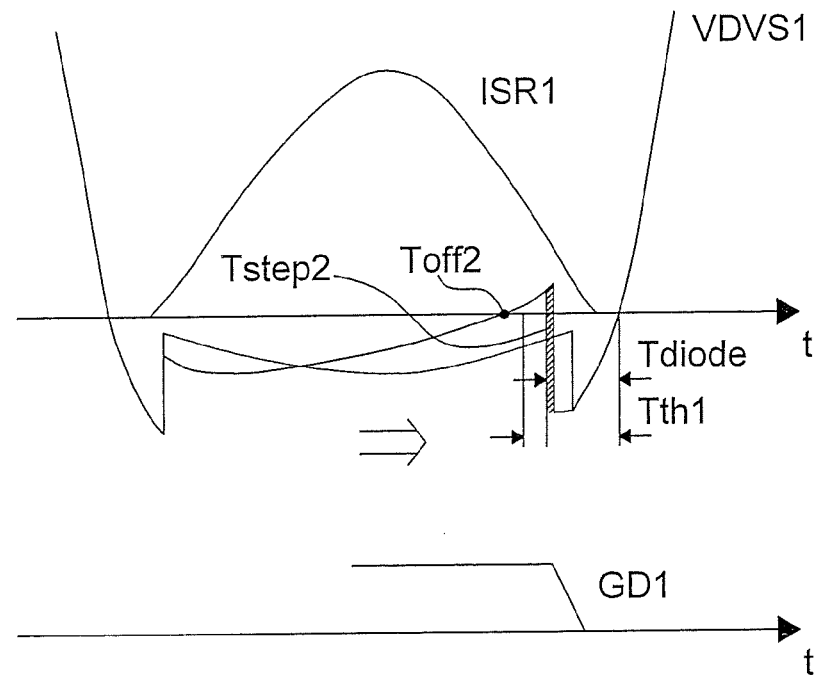
Figure 10E:
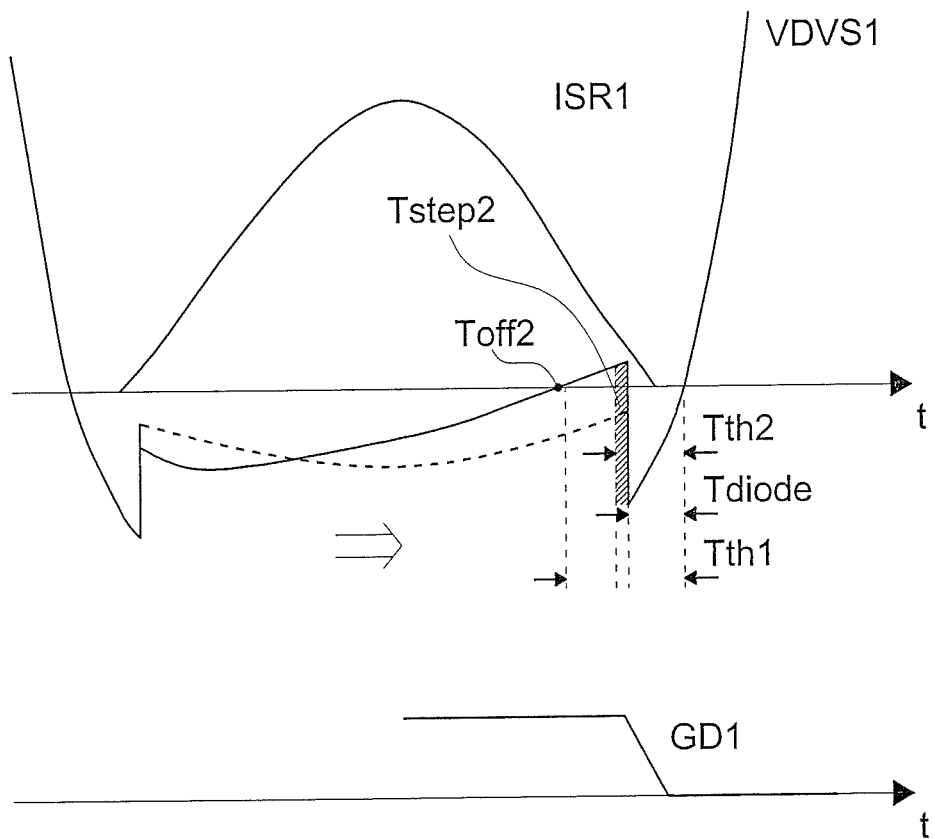

If the measured conduction time $T_{diode}$ is greater than a first threshold value $T_{th1}$ (for example 200 nanoseconds), in the next half-cycle SC1 of the next cycle SW, the driving circuit 11 delays the new off time instant $T_{off1}$ by a first fixed quantity $T_{step1}$ (for example 160 nanoseconds). This is carried out cycle by cycle (FIG. 10c) until the conduction time $T_{diode}$ is lower than first threshold value $T_{th1}$ and greater than a second threshold value $T_{th2}$. In the last case the driving circuit 11 delays the new off time instant $T_{off1}$ by a second fixed quantity $T_{step2}$ (FIG. 10d); this is carried out cycle by cycle until the measured residual conduction time $T_{diode}$ is lower than a second threshold value $T_{th2}$. When the measured residual conduction time $T_{diode}$ is lower than a second threshold value $T_{th2}$ the driving circuit 11 advances the new off time instant $T_{off1}$ by the second fixed quantity $T_{step2}$.

Otherwise, if the measured conduction time $T_{diode}$ is lower than the first threshold value $T_{th1}$ already in the in the next half-cycle SC1 of the next cycle SW and comprised between said first threshold value $T_{th1}$ and the second threshold value $T_{th2}$, the driving circuit 11 delays the new off time instant $T_{off1}$ by a second fixed quantity $T_{step2}$ or, else, if the measured residual conduction time $T_{diode}$ is lower than a second threshold value $T_{th2}$, advances the new off time instant $T_{off1}$ by the second fixed quantity $T_{step2}$.

The second fixed quantity $T_{step2}$ is lower than the first fixed quantity $T_{step1}$ and, in this case, equal to 16 nanoseconds. Having two different time fixed quantities, one great ($T_{step1}$) and the other small ($T_{step2}$), the driving circuit 11 has the possibility to decrease the time $T_{diode}$ rapidly in a first part of the driving operation and carefully in a second part of the driving operation.

During the above described operations, if the second comparator circuit 103b detects a zero crossing event of the drain-source voltage Vdvs1, the driving circuit 11 sets another off time instant $T_{off2}$ of the transistor SR1 (FIG. 10b) equal to the zero crossing time $T_{ZC}$ of the drain-source voltage Vdvs1 in the next switching half-cycle SC1, . . . SCn of the next switching cycle only if the measured residual conduction time $T_{diode}$ is greater than the second threshold value $T_{th2}$. In this case, the same operating steps described involving the new off time instant $T_{off1}$ will be made for the off time instant $T_{off2}$.

The second comparator circuit 103b is a fixed threshold comparator configured to compare the drain-source voltage Vdvs1 with the zero voltage level and to provide an output signal ZCD to the driving circuit 11 which sets the second new off time instant $T_{off2}$ of the transistor SR1.

The control device 7 continues in its operation, never stopping its behavior, by choosing a second fine step $T_{step2}$ to ensure not only the achievement with precision of the desired time $T_{diode}$ but also to have a minimum jitter (in this case ±16 nanoseconds) around the desired turn-off time of the transistor SR1.

The control device 7 according to the preferred embodiment of present disclosure operates in the same manner as above-mentioned even for the transistor SR2 in the other switching half-cycle of the converter switching cycle SW in the case wherein the rectifier comprises two transistors SR1, SR2. Preferably different turn-off delays are used for controlling the transistors SR1 and SR2; even preferably different values of the quantities $T_{step1}$ and/or $T_{step2}$ are used for both the first and second turn-on and off signals GD1, GD2.

Preferably the control device 7 comprises two control sections dedicated for each transistor, one section to control the transistor SR1 and another section for controlling the transistor SR2.

Figure 8:
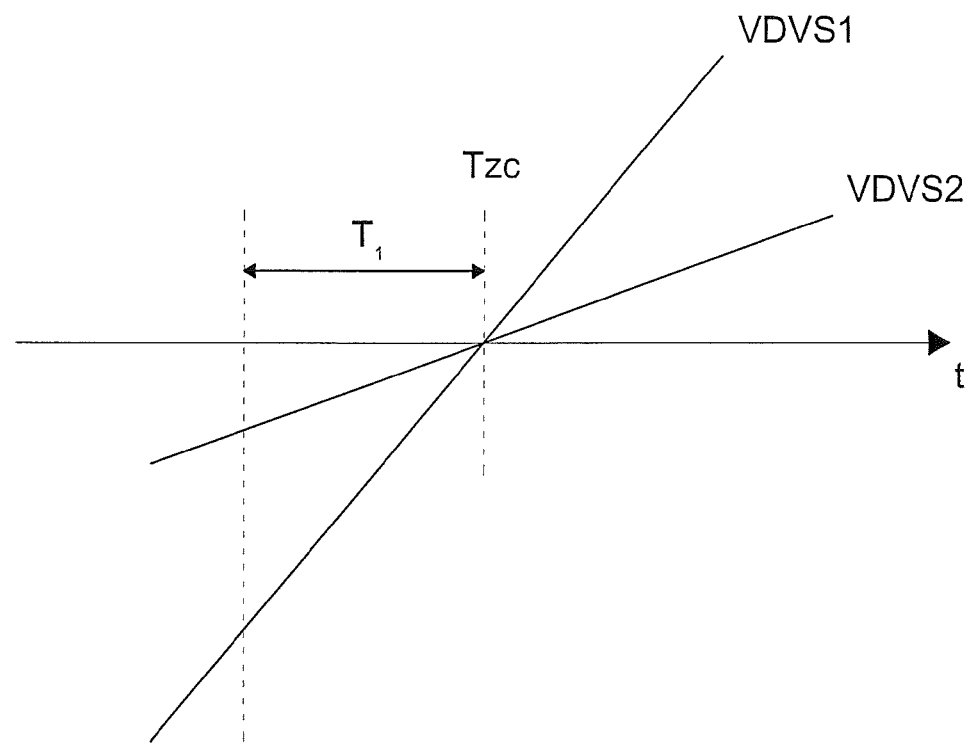
FIG. 8 is a diagram of the delay time period for the turn off time of at least on transistor of the rectifier in FIG. 6 according to a variant of the preferred embodiment of the present disclosure.

According to a variant of the preferred embodiment of the present disclosure the new off time instant of the transistor SR1 in the start switching half-cycle SC1, SC2 of the converter switching cycle is different from that of the preferred embodiment of the present disclosure. Particularly the driving circuit 11, sets the new off time instant $T_{off-pred}$ as the time instant immediately preceding the time interval T1, a small time interval, with respect the time instant $T_{ZC}$ when the voltage Vdsv1 crosses the zero voltage level, that is the ground GND (FIG. 8); the new off time instant $T_{off-pred}$ is determined by a predictive comparator circuit 10.

Figure 9:
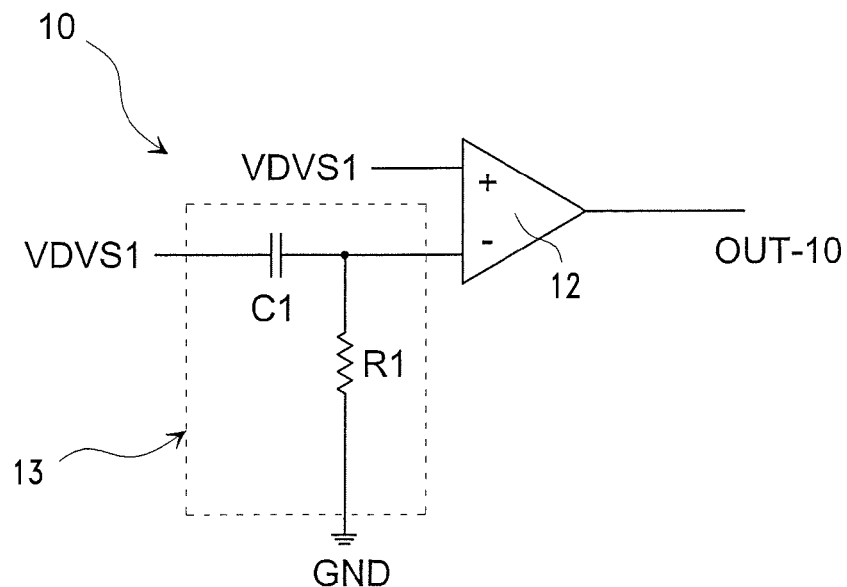
FIG. 9 shows a circuit for inserting the delay time period in FIG. 8.

The predictive comparator circuit 10 (FIG. 9) comprises an operational amplifier 12 which has at the non-inverting input terminal the drain-source voltage Vdvs1 and at the inverting input terminal a network 13 in turn comprising a capacitance C1 arranged between the drain-source voltage Vdvs1 and the inverting input terminal, and a resistance R1 coupled between the inverting input terminal and ground reference GND; the fixed time T1 is given by R1×C1. The derivative effect caused by the network 13 is represented by the formula:

$$\frac{\partial Vdvs1}{\partial t} \times T1 + Vdvs1 = 0.$$

This makes said time interval T1 independent on the slew rate of the current ISR1 (and of the voltage Vdvs1), differently from a comparator with fixed threshold. The output signal of the predictive comparator circuit 10 is the signal OUT-10 at the input of the driving circuit 11.

This time interval T1 is appropriately chosen to take into account the gate drive discharge time of the transistors SR1 and other additional factors before a complete transistor turn-off. A time period T1 of 100 nanoseconds could be enough to ensure a complete transistor turn-off.

This new off time instant $T_{off-pred}$ is appropriately chosen to take into account the gate drive discharge time of the transistors SR1 and other additional factors before a complete transistor turn-off.

Once set the new off time instant $T_{off-pred}$ the process operated for the off time instant $T_{off1}$ of the preferred embodiment (FIG. 10a) are carried out considering the new off time instant $T_{off-pred}$ in the place of the off time instant $T_{off1}$. The driving circuit 11 is then configured to measure the residual conduction time $T_{diode}$ of the body diode Dbr1. Particularly, the residual conduction time $T_{diode}$ starts when the drain-source voltage Vdvs1 goes under the fixed voltage threshold Vthbd and ends when the drain-source voltage Vdvs1 rises reaching the same fixed voltage threshold Vthbd.

If the measured conduction time $T_{diode}$ is greater than a first threshold value $T_{th1}$ (for example 200 nanoseconds), in the next half-cycle SC1 of the next cycle SW, the driving circuit 11 delays the new off time instant $T_{off-pred}$ by a first fixed quantity $T_{step1}$ (for example 160 nanoseconds). This is carried out cycle by cycle (FIG. 10c) until the conduction time $T_{diode}$ is lower than first time threshold value $T_{th1}$ and greater than a second time threshold value $T_{th2}$. In the last case the driving circuit 11 delays the new off time instant $T_{off-pred}$ by a second fixed quantity $T_{step2}$ (FIG. 10d); this is carried out cycle by cycle until the measured residual conduction time $T_{diode}$ is lower than a second time threshold value $T_{th2}$. When the measured residual conduction time $T_{diode}$ is lower than a second threshold value $T_{th2}$ the driving circuit 11 advances the off time instant $T_{off-pred}$ by the second fixed quantity $T_{step2}$.

Otherwise, if the measured conduction time $T_{diode}$ is lower than the first threshold value $T_{th1}$ already in the next half-cycle SC1 of the next cycle SW and comprised between said first threshold value $T_{th1}$ and the second threshold value $T_{th2}$, the driving circuit 11 delays the off time instant $T_{off1}$ by the second fixed quantity $T_{step2}$ or, else, if the measured residual conduction time $T_{diode}$ is lower than the second threshold value $T_{th2}$, advances the off time instant $T_{off-pred}$ by the second fixed quantity $T_{step2}$.

The second fixed quantity $T_{step2}$ is lower than the first fixed quantity $T_{step1}$ and, in this case, equal to 16 nanoseconds. Having two different time fixed quantities, one great $T_{step1}$ and the other small $T_{step2}$, the driving circuit 11 has the possibility to decrease the time $T_{diode}$ rapidly in a first part of the driving operation and carefully in a second part of the driving operation.

During the above described operations, if the second comparator circuit 103b detects a zero crossing event of the drain-source voltage Vdvs1, the off time instant remains the time instant $T_{off-pred}$ and is not changed with the zero crossing time $T_{ZC}$.

The control device 7 continues in its operation, never stopping its behavior, by choosing a second fine step $T_{step2}$ to ensure not only the achievement with precision of the desired time $T_{diode}$ but also to have a minimum jitter (in this case ±16 nanoseconds) around the desired turn-off time of the transistor SR1.

The control device 7 according to the variant of the preferred embodiment of the present disclosure operates in the same manner as above-mentioned even for the transistor SR2 in the other switching half-cycle of the converter switching cycle SW in the case wherein the rectifier comprises two transistors SR1, SR2. Preferably different turn-off delays are used for controlling the transistors SR1 and SR2; even preferably different values of the quantities $T_{step1}$ and/or $T_{step2}$ and/or T1 are used for both the first and second turn-on and off signals GD1, GD2.

Preferably the control device 7 comprises two control sections dedicated for each transistor, one section to control the transistor SR1 and another section for controlling the transistor SR2.

The first comparator circuit 103a is a fixed first threshold comparator configured 103a to compare the drain-source voltage Vdvs1 with said fixed voltage threshold Vthbd (−200 Mv) near the zero level to provide an output signal ON_COMP. In particular, the comparator output signal ON_COMP is a finished step which starts when the drain-source voltage Vdvs1 goes under the fixed voltage threshold Vthbd and ends when the drain-source voltage Vdvs1 rises reaching the same fixed voltage threshold Vthbd, having a duration equal to the residual conduction time $T_{diode}$.

A possible implementation of the driving circuit 11 which considers both the preferred embodiment and the variant of the preferred embodiment is shown in FIG. 11. The driving circuit 11 comprises a first edge triggered flip-flop 110 having at a data input that receives the pulse signal ON_COMP and has a clock input that receipts signal ON_TH1 as a synchronizing input signal; the signal ON_TH1 is a pulse signal having a rising edge of the pulse which is delayed with respect to the rising edge of the pulse signal ON_COMP by the time interval equal to $T_{th1}$. The signal ON_COMP is sampled by the signal ON_TH1, so that, if the signal ON_TH1 rises to the high logic level before the signal ON_COMP falls to the low logic level, both the signals are high and the first FLIP-FLOP 110 generates an output signal S1 equal to "1" (which means that the time $T_{diode}$ is greater than the time period $T_{th1}$) otherwise, if the signal ON_TH1 rises to the high logic level after the signal ON_COMP falls to the low logic level, the output signal S1 is equal to "0" (which means that the time $T_{diode}$ is lower than the time period $T_{th1}$).

Likewise, when the residual conduction time $T_{diode}$ is lower than the time period $T_{th1}$, the signal ON_COMP is then provided at the data input of a second edge triggered flip-flop 111 which has a clock input that receives a signal ON_TH2 as a synchronizing input signal; the signal ON_TH2 is a pulse signal having a rising edge of the pulse which is delayed with respect to the rising edge of the pulse signal ON_COMP by the time interval equal to $T_{th2}$. The signal ON_COMP is sampled by the ON_TH2, so that, if the signal ON_TH2 rises to the high logic level before the signal ON_COMP falls to the low logic level both the signals are high the second flip-flop 111 gives an output signal S2 equal to "1" (which means that the time $T_{diode}$ is greater than the time period $T_{th2}$) otherwise, if the signal ON_TH2 rises to the high logic level after the signal ON_COMP falls to the low logic level, the output signal S2 is equal to "0" (which means that the time $T_{diode}$ is lower than the time period $T_{th2}$).

The two output signals S1, S2 are at the input of a control logic circuit 113 which processes said two signals S1, S2 and generates two control signals CTRL1, CTRL2 in response to the signal S1, S2; the control signals CTRL1, CTRL2 are responsible for setting the off time delays $T_{step1}$ and $T_{step2}$ of the off time instant $T_{off1}$, $T_{off-fix}$ or $T_{off1}$. By means of the control signals CTRL1, CTRL2 is possible to choose which entity to move step by step the off time instant along the time axis, reducing the jitter around the desired off time instant.

Figure 13:
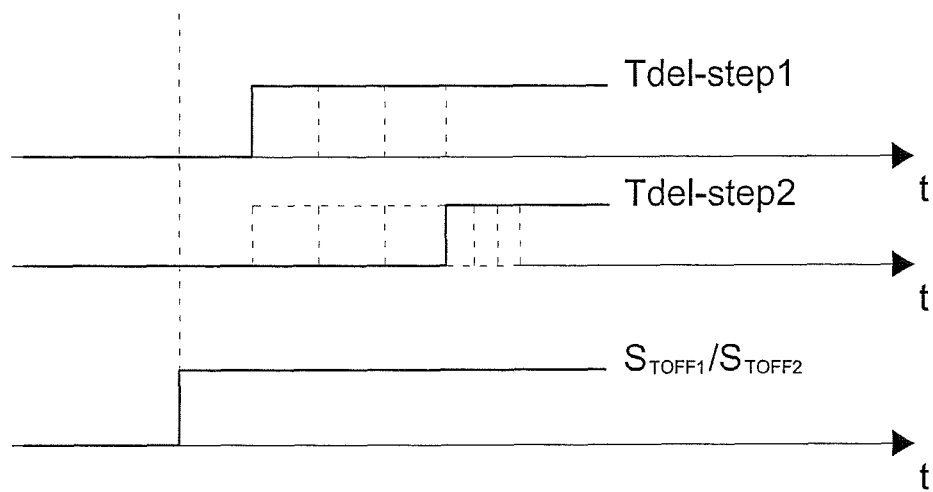

A third edge triggered flip-flop 112 having a data input that receives the signal ZCD and a clock input that receives a signal TDEL OFF as a synchronizing input signal provides an output signal Q; the logic circuit 113 in response to the output signal Q of the edge triggered flip-flop 112 provides the control signal TOFF SEL. The synchronizing signal TDEL OFF derives from the output of a first AND gate AND1 performing an AND logic operation between the signals $T_{del-step1}$ an which are and $T_{del-step2}$ two signals representing respectively the delay time periods $T_{step1}$ and $T_{step2}$; the waveforms of the signals $T_{del-step1}$ and $T_{del-step2}$ are shown in FIG. 13. Particularly the signals $T_{del-step1}$ and $T_{del-step2}$ rises from the low logic level to the high logic level every time wherein the driving circuit 11 inserts the delay time period $T_{step1}$ while every time wherein the driving circuit 11 inserts the delay time period $T_{step2}$ the signal $T_{del\text{-}step2}$ rises from the low logic level to the high logic level and the signal $T_{del\text{-}step1}$ is at the high logic level cycle by cycle, that is the signal $T_{del\text{-}step1}$ when the driving circuit does not insert the delay time period $T_{step1}$ but the delay time period $T_{step2}$ is at the high logic level.

The signal ZCD is sampled by the signal TDEL OFF, so that, if both the signals are high the second FLIP-FLOP 112 generates an output signal Q equal to "1" (which means that a zero crossing event of the drain-source voltage Vdvs1 was detected by the comparator circuit 103b when the new off time instant $T_{off1}$ is delayed by the time period $T_{step1}$ or $T_{step2}$) otherwise equal to "0" (which means that no zero crossing event of the drain-source voltage Vdvs1 was detected). The control signal TOFF SEL is equal to "1" if the signal Q=1 and the measured conduction time $T_{diode}$ is greater than the second threshold value $T_{th2}$ otherwise the control signal TOFF SEL is equal to "0".

The control signal TOFF SEL selects one of the two inputs of a multiplexer MUX1 and then provides the one selected to the output thereof, said inputs are the signal $S_{Toff1}$ and $S_{Toff2}$ which are responsive of the respective off time instants $T_{off1}$ and $T_{off2}$; particularly the signal $S_{Toff1}$ and $S_{Toff2}$ rises from the low logic level to the high logic level at the time instants $T_{off1}$ and $T_{off2}$ and are maintained at the high logic level after said time instants. Thus, until no zero crossing event ZCD is detected, the off time instant $T_{off1}$ is selected by the output signal TOFF SEL, otherwise, when a zero crossing event is detected and the measured conduction time $T_{diode}$ is greater than the second threshold value $T_{th2}$, the off time instant $T_{off2}$ is selected by the control signal TOFF SEL.

Preferably the signal at the output of the multiplexer MUX1 is at the input of another multiplexer MUX2 having at the input even the output signal OUT-10 of the predictive comparator circuit 10. The control signal CTRL3 deriving from the logic circuit 113 selects one of the two inputs of a multiplexer MUX2 and then provides the one selected to the output thereof.

The signal at the output of the multiplexer MUX2 is at the input of a programmable delay block PROG STEP 1 adapted to generate the signal $T_{del\text{-}step1}$. The last is at the input of another programmable delay block PROG STEP 2 which provides the signal $T_{del\text{-}step2}$. The control signals CTRL1, CTRL2 act on said programmable delay blocks PROG STEP 1, PROG STEP 2 respectively.

A second AND gate AND2 performs an AND logic operation between the signal TDEL OFF and one of the signals $S_{Toff1}$, $S_{Toff2}$ or OUT-10. The result of said last AND logic operation is a signal Gate drive OFF which is provided to the gate of the MOS transistor SR1 through a buffer 115.

According to another variant of the preferred embodiment of the present disclosure the new off time instant of the transistor SR1 in the start switching half-cycle SC1, SC2 of the converter switching cycle is different from that of the preferred embodiment of the present disclosure and of the variant thereof; the new off time instant of the transistor SR1 in the start switching half-cycle SC1, SC2 of the converter switching cycle is the normal off time instant, that is the off time instant $T_{off}$ of prior art. All the process steps operated for the off time instant $T_{off1}$ of the preferred embodiment are carried out considering the as new off time instant the time instant $T_{off}$ in the place of the off time instant $T_{off1}$.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device, comprising:
   a driver circuit configured to generate a first control signal configured to turn on and off a first transistor of a rectifier of a switching converter; and
   a measuring circuit configured to measure a conduction time of a body diode of the transistor during each of a plurality of switching cycles of the converter, the measuring circuit being configured to cycle by cycle determine whether the measured conduction time is greater or less than a first threshold value, wherein the driver circuit is configured to:
      delay an off time instant of the transistor by a first fixed quantity in a next switching cycle when the measured conduction time is greater than the first threshold value, cycle by cycle until the measured conduction time is less than the first threshold value and comprised between said first threshold value and a second threshold value,
      delay the off time instant of the transistor by a second fixed quantity in the next switching cycle when the measured conduction time is lower than the first threshold value and comprised between said first threshold value and the second threshold value, cycle by cycle until the measured conduction time is lower than the second threshold value, said second fixed quantity being less than the first fixed quantity, and
      advance the off time instant of the transistor by said second fixed quantity in the next switching cycle.

2. The control device according to claim 1, comprising a zero crossing detector configured to detect a zero crossing time instant of a drain-source voltage of the transistor during each cycle, said zero crossing detector being configured, cycle by cycle after a start switching cycle of the converter, to verify the detection of a zero crossing event of the drain-source voltage of the transistor, wherein the driver circuit is configured to:
   set the zero crossing time instant of the drain-source voltage as the off time instant of the transistor in the next switching cycle when the measured conduction time is greater than the second threshold value.

3. The control device according to claim 1, wherein said driver circuit is configured to set the off time instant of the transistor in a start switching cycle at an end of a time interval immediately preceding the zero crossing time instant of the drain-source voltage.

4. The control device according to claim 3, further comprising a predictive comparator circuit configured to cause the driver circuit to set the off time instant of the transistor in the start switching cycle, said predictive comparator circuit including:
   an input configured to receive the drain-source voltage of said transistor;
   an operational amplifier having an inverting terminal, a non-inverting terminal coupled to the input and configured to receive the drain-source voltage of said transistor, and an output terminal configured to supply an output voltage to the driver circuit; and
   a timing circuit including a capacitance and a resistance, the capacitance being positioned between the inverting terminal and the input, the resistance being coupled between said inverting terminal and ground, and the time interval being equal to a product of said capacitance and said resistance.

5. The control device according to claim 3, wherein said time interval of the off time instant of the transistor is a fixed quantity.

6. The control device according to claim 5, wherein the off time instant of the transistor in the start switching cycle is a percentage of the start switching cycle.

7. The control device according to claim 1, wherein the measuring circuit comprises a comparator circuit configured to generate a pulse signal which starts when the drain-source voltage of the transistor goes under a fixed voltage threshold and ends when said drain-source voltage again reaches the same fixed voltage threshold.

8. The control device according to claim 1, wherein the measuring circuit is configured to supply a measuring pulse signal and the driver circuit includes:
a first edge triggered flip-flop having a first data input, a first clock input, and a first output, the first data input being configured to receive the measuring pulse signal, the first clock input being configured to receive a first threshold pulse signal having a rising edge delayed from a rising edge of the measuring pulse signal by the first threshold value, and the first output being configured to supply a first output signal that reflects a sampling of the measuring pulse signal by the first threshold pulse signal; and
a second edge triggered flip-flop having a second data input, a second clock input, and a second output, the second data input being configured to receive the measuring pulse signal, the second clock input being configured to receive a second threshold pulse signal having a rising edge delayed from the rising edge of the measuring pulse signal by the second threshold value, and second output being configured to supply a second output signal that reflects a sampling of the measuring pulse signal by the second threshold pulse signal;
a first programmable delay block configured to provide the first fixed quantity in response to the first output signal; and
a second programmable delay block configured to provide the second fixed quantity in response to the second output signal.

9. The control device according to claim 1, wherein said driver circuit is configured to generate a second control signal configured to turn on and off a second transistor of the rectifier, the first control signal being configured to turn on and off the first transistor during first half-cycles of the switching cycles and the second control signal being configured to turn on and off the second transistor during second half-cycles of the switching cycles.

10. The control device according to claim 9, wherein said control device is configured to drive synchronously said first and second transistors using said first and second control signals, respectively.

11. A method, comprising:
controlling a rectifier of a switching converter, the rectifier including a first transistor, the controlling including:
controlling a turn on and turn off of the first transistor with a first control signal during a plurality of cycles, and cycle by cycle:
measuring a conduction time of a body diode of the first transistor in the cycle,
verifying whether the measured conduction time is greater or less than a first threshold value,
in response to determining that the measured conduction time is greater than the first threshold value, delaying an off time instant of the first transistor by a first fixed quantity in a next switching cycle, cycle by cycle until the measured conduction time is less than a first threshold value and comprised between said first threshold value and a second threshold value,
in response to determining that the measured conduction time is lower than the first threshold value and comprised between said first threshold value and the second threshold value, delaying the off time instant of the first transistor by a second fixed quantity in the next switching cycle, cycle by cycle until the measured conduction time is lower than the second threshold value, said second fixed quantity being less than the first fixed quantity,
in response to determining that the measured conduction time is lower than the second threshold value, advancing the off time instant of the first transistor by said second fixed quantity in the next switching cycle.

12. The method according to claim 11, comprising:
after a start switching cycle, verifying cycle by cycle whether a zero crossing event of a drain-source voltage of the first transistor,
if the zero crossing event of the drain-source voltage is detected and the measured conduction time is greater than the second threshold value, setting a zero crossing time instant of the drain-source voltage as the off time instant of the first transistor in the next switching cycle.

13. The method according to claim 11, comprising setting the off time instant of the first transistor in a start switching cycle as the time instant immediately preceding a time interval with respect to a zero crossing time instant of a drain-source voltage of the first transistor.

14. The method according to claim 13, comprising setting said time interval using a predictive comparator circuit that includes an operational amplifier having at a non-inverting terminal that receives the drain-source voltage of said first transistor and an inverting terminal coupled with the drain-source voltage of said first transistor by a timing circuit that includes a capacitance and a resistance, the time interval being equal to a product of said capacitance and said resistance.

15. The method according to claim 13, wherein said time interval is a fixed quantity.

16. The method according to claim 15, comprising setting the off time instant of the first transistor in the start switching cycle as a percentage of the start switching cycle.

17. The method of claim 11, comprising controlling a turn on and turn off of a second transistor with a second control signal, the first control signal turning on and off the first transistor during first half-cycles of the switching cycles and the second control signal turning on and off the second transistor during second half-cycles of the switching cycles.

* * * * *